US009690628B2

(12) United States Patent
Engholm et al.

(10) Patent No.: US 9,690,628 B2
(45) Date of Patent: Jun. 27, 2017

(54) METHOD OF SECURELY DELIVERING AN ELECTRONIC REPRODUCTION FROM A SCANNER

(71) Applicant: Contex A/S, Allerød (DK)

(72) Inventors: Nis Engholm, Fredensborg (DK); Jørgen Rasmussen, Hørsholm (DK); Peter Nissen, Skævinge (DK)

(73) Assignee: Contex A/S, Allerød (DK)

( * ) Notice: Subject to any disclaimer, the term of this patent is extended or adjusted under 35 U.S.C. 154(b) by 0 days.

(21) Appl. No.: 14/647,045

(22) PCT Filed: Nov. 23, 2012

(86) PCT No.: PCT/EP2012/073514
§ 371 (c)(1),
(2) Date: May 22, 2015

(87) PCT Pub. No.: WO2014/079510
PCT Pub. Date: May 30, 2014

(65) Prior Publication Data
US 2015/0324235 A1    Nov. 12, 2015

(51) Int. Cl.
*H04N 1/193*    (2006.01)
*G06F 9/50*    (2006.01)
(Continued)

(52) U.S. Cl.
CPC ........... *G06F 9/5027* (2013.01); *G06Q 10/02* (2013.01); *H04N 1/0005* (2013.01);
(Continued)

(58) Field of Classification Search
CPC .......... G06F 9/5027; G06F 2209/5014; H04N 1/00013
See application file for complete search history.

(56) References Cited

U.S. PATENT DOCUMENTS

2003/0043423 A1    3/2003 Johnston et al.
2004/0215780 A1*  10/2004 Kawato ............... H04L 12/5695
                                                                          709/226
(Continued)

FOREIGN PATENT DOCUMENTS

EP    1011259 A2    6/2000

OTHER PUBLICATIONS

International Search Report received for PCT Patent Application No. PCT/EP2012/073514, mailed on Jul. 1, 2013, 3 pages.
(Continued)

*Primary Examiner* — Benny Q Tieu
*Assistant Examiner* — Haris Sabah
(74) *Attorney, Agent, or Firm* — Morrison & Foerster LLP

(57) ABSTRACT

A method of operating a server computer serving a group of scanners; wherein the scanners are registered in a database with a respective indication of reservation status. The method includes receiving, at the server computer, a request for a scanning operation from a user's electronic device; wherein the request includes a user identifier and a scanner identifier; granting a reservation of the selected scanner upon reception of the request for a scanning operation, wherein the reservation lapses unless the request is confirmed within a predefined time period; and receiving, from the selected scanner, a predefined user generated event. Upon reception of the predefined user generated event within the predefined time period: maintaining the reservation until a scanning operation is terminated or cancelled, and transmitting any electronic reproduction resulting from the selected scanning operation performed at the selected scanner to the user identified by the user identifier.

12 Claims, 4 Drawing Sheets

(51) Int. Cl.
*H04N 1/00* (2006.01)
*G06Q 10/02* (2012.01)

(52) U.S. Cl.
CPC ..... *H04N 1/00005* (2013.01); *H04N 1/00018* (2013.01); *H04N 1/00084* (2013.01); *H04N 1/00225* (2013.01); *H04N 1/00244* (2013.01); *H04N 2201/001* (2013.01); *H04N 2201/0072* (2013.01)

(56) References Cited

U.S. PATENT DOCUMENTS

| | | | | |
|---|---|---|---|---|
| 2007/0081186 | A1* | 4/2007 | Numata | H04N 1/00352 358/1.15 |
| 2007/0294697 | A1 | 12/2007 | Theimer et al. | |
| 2008/0237331 | A1* | 10/2008 | Hammer | G06K 7/10851 235/375 |
| 2008/0278774 | A1* | 11/2008 | Enami | H04N 1/00681 358/475 |
| 2012/0081758 | A1* | 4/2012 | Jang | H04N 1/00212 358/402 |
| 2012/0092684 | A1* | 4/2012 | Kondo | G06K 15/105 358/1.2 |

OTHER PUBLICATIONS

Written Opinion received for PCT Patent Application No. PCT/EP2012/073514, mailed on Nov. 10, 2014, 7 pages.
International Preliminary Report on Patentability received for PCT Patent Application No. PCT/EP2012/073514, mailed on Feb. 11, 2015, 15 pages.
Kircher et al., "Pattern-Oriented Software Architecture vol. 3: Patterns for Resource Management", John Wiley & Sons, Jun. 14, 2004, 12 pages.

* cited by examiner

METHOD OF SECURELY DELIVERING AN ELECTRONIC REPRODUCTION FROM A SCANNER

BACKGROUND

A special-purpose scanner such as a large format document scanner is configured for scanning of documents that are larger than the standard A4 format or, typically, larger than the A3 (297×420 mm) format, typically configured for the A2 (420×594 mm), A1 (594×841 mm) or A0 (841×1189 mm) format. Large format document scanners thus have a wide scanner body to accommodate the wider format of a large format document, which may be 50, 60 or 70 inches wide or even wider.

Large format scanners are typically manufactured in relatively low production volumes compared to the much more widespread A4 format document scanners and also A3 format scanners.

For large format document scanners special optical systems are needed to cover the wide format of a large format document. Typically, a large format scanner is equipped with multiple line cameras or line sensors that deliver respective image data that are stitched together to form, in combination, an electronic reproduction of a scanned physical document.

Large format scanners based on such, and other large format scanner technologies, are costly to manufacture due to their complexity and relatively low production volumes.

Given, among other things, the relatively low production volumes of large format scanners, conventionally available user interface technologies like colour and touch sensitive displays are not commercially viable solutions for large format scanners.

Taking the above into account, large format document scanners are typically installed for use in a professional and private setup, e.g. with dedicated computers for configuring a scanner and post-processing an electronic reproduction (an electronic document) delivered from the scanner.

Other special-purpose scanners comprise and are not limited to scanners such as 3D object scanners, e.g. 3D laser object scanners, microwave scanners such as Roentgen scanners or Terahertz scanners.

RELATED PRIOR ART

Special-purpose scanners are typically equipped with a limited or sparse user interface. Then there are typically no options available for selecting a destination of the electronic reproduction. One reason is that e.g. special-purpose scanners (such as large format document scanners or 3D object scanners) are manufactured in relatively low volumes, which in turn makes it very costly to provide more advanced user interfaces that meet a modern user's expectations.

Today, such special-purpose scanners often operate in unison with a computer, e.g. a personal computer and/or dedicated separate computer, connected via a data network to the special-purpose scanner.

Special-purpose scanners are more likely to be installed in shops or other professional environments where scanning services are offered. However, today there is a technical barrier hindering the more occasional user from using such special-purpose scanners in a convenient way.

Further, problems remain in the prior art as to how to make sure that an electronic reproduction from a scanner is delivered to the right user in a group of users.

SUMMARY

There is provided a computer-implemented method of operating a server computer serving a group of scanners connected to a server computer via a data network; wherein the scanners are registered in a database with a respective indication of reservation status. The method comprises: receiving, at the server computer, a request for a scanning operation from a user's electronic device; wherein the request comprises a user identifier and a scanner identifier selecting a scanner as a selected scanner from among the group of scanners; granting a reservation of the selected scanner upon reception of the request for a scanning operation, comprising altering the reservation status in the database; wherein the reservation lapses unless the request is confirmed within a predefined time period; receiving, from the selected scanner, a predefined user generated event; wherein, upon reception of the predefined user generated event within the predefined time period, the server: maintains the reservation until a scanning operation is terminated or cancelled, and assigns any electronic reproduction resulting from the selected scanning operation performed at the selected scanner to the user identified by the user identifier.

Thus, the user submits a request from a device and then, within a predefined, typically relatively short period of time, confirms the request on the scanner itself, which in turn transmits a signal representing the predefined user generated event to the server computer. The server computer is thereby in possession of the request and the confirmation.

Due to the timewise close occurrence of the request and the confirmation, it can be assumed that the person requesting is the same as the person confirming. Any following electronic reproduction can thus be delivered to the right person.

Consequently, a method that delivers the electronic reproduction to the right user is provided. Thereby privacy of personal electronic reproductions is protected. This opens the option of installing a special-purpose scanner in a public or semi-public environment where more occasional users themselves can request and initiate a scanning operation by means of their electronic device and a special-purpose scanner in a convenient way.

The method is especially expedient for a scanner that is equipped with a limited or sparse user interface. Then, there are typically no options available for selecting a destination of the electronic reproduction on the scanner. However, according to the method, a user can submit a request for a scanning operation from his electronic device, e.g. a smartphone, which is loaded with a user interface e.g. in the form of a web-page rendered in a browser of the electronic device or in the form of a user interface of a so-called app or other type of programme or software installed on the electronic device. The request is configured to comprise a user identifier and a scanner identifier selecting a scanner as a selected scanner from among the group of scanners.

When the request is submitted from the user's device it is then received at the server computer which in general will grant a reservation of the selected scanner. To keep track of whether the scanner is reserved, the reservation status for the selected scanner is altered in the database. However, the reservation lapses unless the request is confirmed within a predefined time period. Thereby the risk that another user interferes with the request already made is reduced.

Conventionally, scanners are equipped with a button that the user presses when the object to be scanned is properly installed, inserted or loaded in the scanner. In some embodiments such a button is configured to generate the predefined user generated event. In some embodiments the event is generated by a sensor, in the scanner, that detects when paper is inserted in the scanner.

In some embodiments, the reservation lapses at the end of the predefined time period, unless the request is confirmed within a predefined time period. This is an example of a premature lapse of the reservation period. The predefined time period starts when the request is granted, when the reservation status is changed or shortly thereafter, typically the time lapsed from the user submits his request and until the predetermined time period starts is short compared to the length of the predetermined time period. In some embodiments the predetermined time period is about 20 seconds, 35 seconds, 60 seconds or it has a longer or shorter duration. The duration may be different from one scanner to another or it may be substantially the same for all scanners in the group.

In some embodiments the reservation is maintained, in the sense that other users cannot interfere by being granted concurring or parallel scanning operations at the same scanner. In some embodiments a scanning operation is terminated when a scanner or the server reports that a scanning operation is complete in the sense that the scanner has completed its scanning of a document or other object in question. A particular issue with special-purpose scanners is that typically relatively large amounts of data are generated and a more general issue is that the quality of the data transmission service of a network can vary. It is thus difficult to predict the timewise duration of a scanning operation including data transmission of data resulting from the scanning operation to a server or another destination. Therefore, by maintaining the reservation until the scanning is complete it is ensured that the scanner has actually completed a scanning operation and has off-/up-loaded its data.

In some embodiments, a scanning operation is cancelled in case of technical faults or interruptions or in case a user initiates a cancelling of the scanning operation.

In some embodiments, the scanner transmits so-called scan data to the server computer which converts the scan data into a file or document for delivery to the user. The term 'electronic reproduction' encompasses such scan data, files or documents in any form.

The server computer is configured to transmit an electronic reproduction received from the scanner to a destination (e.g. an email address) specified with the user identifier. In some embodiment the server performs processing of the electronic reproduction received from the scanner (typically in the form of so-called scan data) before transmitting to the destination (typically in the form of an electronic file or electronic document). In some embodiments, when a request is granted, a pre-assignment of any following electronic reproduction from the selected scanner to that destination is made in the database. If the request is not confirmed within the predetermined time period the pre-assignment is cleared.

In some embodiments the requests are granted exclusively so as to prevent concurrent (subsequent) reservations for the same selected scanner. As a step of an exclusive grant the server computer looks up the reservation status to check reservation status before a request is granted. In case the scanner is reserved, a further request is rejected or queued for a subsequent grant. In some embodiments the server computer sends a so-called push notification to the user's device when the scanner is free.

In some embodiments, a scanner is registered in the database as a selectable scanner, e.g. a selectable document scanner. This may be useful for providing information to a user that the document scanner is generally available, but that at present it is reserved for another scan job.

In some embodiments the method comprises a step wherein a user registers himself prior to him being given access to request a scanning operation.

In some embodiments the user's electronic device is a programmable electronic device, e.g. a smart phone, a tablet device or the like with an Internet browser. The electronic device may also be a personal computer or a computer accommodated in a kiosk stand wherefrom document scanning operations can be ordered.

In some embodiments the method is performed on computer hardware operated as a so-called cloud service. The scanners are equipped with a data network interface and are configured to transmit so-called alive-signals to the server computer. In some embodiments the document scanners are configured to transmit electronic data, e.g. often denoted scan data, to the server computer irrespective of which user that requested the scanning operation generating the data. In such a setup, the document scanners do not need to deal with registration of users, different user specific destinations for the electronic documents, etc.; this can be handled by the server computer. Thereby, many conventional data network enabled document scanners can be used in this setup with only limited special configuration.

The request for a scanning operation comprises a user identifier and a scanner identifier in the sense that it contains in some way or is associated with a user identifier and a scanner identifier. In some embodiments the request is submitted in a first step, wherein the scanner identifier is submitted, and in a second, subsequent step, wherein the user identifier is submitted. Before the second step, e.g. between the first and the second step, the user can be prompted with a login-type interaction where he is prompted for the user identifier e.g. in the form of login credentials.

In some embodiments the method comprises reading a code and submitting the code as a scanner identifier in the request for a scanning operation; wherein the code uniquely identifies the document scanner among the group of document scanners.

In some embodiments the code is a visual code or a radio frequency detectable code read by the user's electronic device. In some embodiments all or some of the document scanners in the group of scanners have a computer-readable code (such as a text code, a matrix code or a bar code) printed on a label attached to the scanner body or otherwise appearing on the scanner body or in the vicinity thereof. In some embodiments the code is a so-called QR-code. The user's electronic device is e.g. a mobile phone with Internet access and a camera and software to make the phone operate as a code reader. The computer-readable code contains encoded therein a Unified Resource Locator, URL, with parameters inter alia indicating the respective scanner e.g. by its serial number or an alias name. The server computer receives the code which is processed as a request for a scanner operation. In some embodiments the visual code is a text code that a user can enter by a keyboard of his electronic device. The user identifier is submitted as described above or in another way.

In some embodiments the code is encoded into a so-called NFC tag (Near Field Communications) attached to the scanner or to a location in the vicinity of the scanner. The user's device is a so-called NFC enabled device, which can read the code via Radio Frequency communication when it is within a close range of the NFC tag. In this way the user's device can read the code and transmit it with or as a request for a scanning operation. In some embodiments reading (also called scanning) of the NFC code can be used to raise the predefined user generated event, e.g. when a user holds his NFC enabled device close to the NFC tag.

In some embodiments the step of transmitting an electronic reproduction resulting from the selected scanning operation performed at the selected scanner to the user identified by the user identifier is performed by: receiving, at the server computer, any electronic reproduction resulting from the selected scanning operation performed at the selected scanner; and transmitting, from the server computer, to the user identified by the user identifier.

Thereby the scanner transmits the electronic reproduction to the server computer irrespective of which user and which delivery destination that are selected. Thus, in all events the electronic reproduction is transmitted to the server computer. This keeps the complexity of the scanner relatively low.

The server computer then routes the electronic reproduction to the right user and to the address specified by him.

In some embodiments the method comprises the step of signalling to the user, via the document scanner or via transmission to the user's electronic device, whether a scanner operation is granted or not.

Thereby the user is given feedback that his request is granted. In some embodiments the signal is given via the document scanner, e.g. the signal is used to direct the user's attention to the fact that confirmation is needed to maintain the reservation.

To secure privacy, the user simply has to make a scan only when he receives confirmation that his request for a scanning operation has been granted. If the user does not receive the confirmation it is an indication that either the scanning operation is already granted to another person and is delivered to that other person or that there is a malfunction.

The signal can be in the form of an audio and/or visual signal, e.g. a field of light changing colour from red to green. Alternatively, or additionally, the signal is sent to the user's electronic device to give response to the same user interface location wherefrom the request was made. In some embodiments the signal given at the user's electronic device comprises a visual code, e.g. instructions or an alert in text on how to proceed at the scanner.

In some embodiments the user identifier is linked to or comprises an email address, and wherein the method comprises sending the first electronic document to the email address.

Thereby, the convenience typically experienced with (multi-user or shared) scanners in a private network can be extended to large format scanners, i.e. the scanned document arrives in the user's email inbox.

In some embodiments the email address is the user identifier. In other embodiments, the user identifier is a name or an alias. The electronic document is delivered as an attachment to an email, e.g. in a PDF, JPEG, TIFF, XML or other text and/or image format.

In some embodiments the user identifier is linked to or comprises user credentials, and wherein the method comprises storing the first electronic document at an electronic storage space with login and download access protected by said user credentials.

In some embodiments the reproduced document is transmitted from the scanner to the server computer and then uploaded or posted via a storage service. In some embodiments the storage service is dedicated to delivering scanned documents as a part of a scanning service. In other embodiments a scanned document is uploaded to either a preselected storage service or to a storage service selected by the user.

In some embodiments the method comprises running a web-server or web-service that, upon request for a web-response, transmits a web-response to the electronic device to configure it with a user interface for the user to enter information for the request.

In some embodiments the response is a web-page or a web-response for a so-called app (a software programme) installed on the electronic device. Running a web-server and making the user interface for entering a request for a scanning operation accessible as a web-page is a flexible solution that makes it possible to easily deliver the scanning service on different types of smart phones or other devices with a web-browser (i.e. on different platforms).

Alternatively, so-called apps (software applications for smart phones, tablets or other computing devices) can provide access to the web-server or web-service.

In some embodiments the method comprises receiving settings for the document scanner from the user; and transmitting the settings to the selected document scanner for it to perform a scanning operation in accordance therewith.

In some embodiments, for a first range of scanners, there is provided a user interface control for selecting a scanning resolution e.g. in option 1: 300×300 DPI and in option 2: 400×400 DPI, whereas for a second range of scanners additionally a third option 3 is 600×600 DPI. In some embodiments selectable options comprise 1) colour scanning; 2) monochrome (black and white) scanning and 3) Gray-tone scanning. Other settings known in the field of scanners may be selectable as well or alternatively, e.g. paper size. Thereby different types of document scanners with respective different possible settings can be served.

In an embodiment a web-server transmits a homepage adapted to a range of such technical options available at the selected document scanner and adapted with user interface controls to receive a user's choice of an available option. Providing the options available at the scanner in question to the user and transmitting those chosen settings to the scanner in question make it possible to give the scanner preset values and have the scanning operation performed in accordance therewith.

In some embodiments the method comprises receiving an electronic reproduction from a scanner registered in the database; receiving scanner specific calibration data from the scanner; and processing one or more electronic documents received from the scanner in accordance with the calibration data.

In this way the server, which may be a server instance dedicated to a specific scanner or a specific scan job at a specific scanner, supplies the processing resources required to process the document. Thereby, the processing resources can be dynamically allocated as required. In some embodiments the calibration data comprises so-called light intensity profiles for correcting the response of individual pixels of a line camera of the scanner. The calibration data can be acquired or measured in different ways as known in the art. Calibration data may also comprise colour calibration data.

In some embodiments the scanner is configured to synchronise calibration data between the scanner and the server computer. The synchronisation can be based on a time stamp of the calibration data, wherein the server requests the most recent calibration data from the scanner. The scanner can be configured to transmit the time stamp of its most recent calibration data with an electronic document. Thereby the server can decide if it needs more recent calibration data from the scanner. The server or the scanner may be a master in a master-slave configuration for performing the synchronisation.

In some embodiment the data including the electronic documents are communicated between the scanner and server in accordance with a proprietary format, whereas the electronic document transmitted from the server to a user is converted to an open format like PDF.

In some embodiments the method comprises receiving, from the selected scanner, a predefined further user-generated event; wherein, upon reception of the predefined further user-generated event within the predefined further time period, the server: maintains the reservation until a further scanning operation is terminated or cancelled, and assigns any further electronic reproduction from the further scanning operation to the user identified by the user identifier.

In some embodiments, if the predefined further user-generated event is not received within the predefined further time period, the reservation lapses. That is, the reservation lapses unless the request is confirmed within the predefined further time period. In this situation, since the user did not confirm a further scanning operation, no further electronic reproduction is delivered to the user.

In some embodiments the request for a scanning operation comprises an indication that a multi-page scanning operation is requested; and wherein the server computer receives multiple electronic reproductions from respective scanning operations, which multiple electronic reproductions are processed by the server and delivered to the user identified by the user identifier.

In some embodiments the multiple electronic reproductions are processed to be included in a multi-page electronic document, e.g. in a PDF document, which is delivered to the user. As mentioned, the processing may also comprise correction of scan data received at the server from the scanner.

There is also provided a computer-readable medium encoded with code means to perform the above method. There is also provided a computer system configured to perform the method.

BRIEF DESCRIPTION OF THE FIGURES

A more detailed description follows below with reference to the drawing, in which.

DETAILED DESCRIPTION

Figure 1:
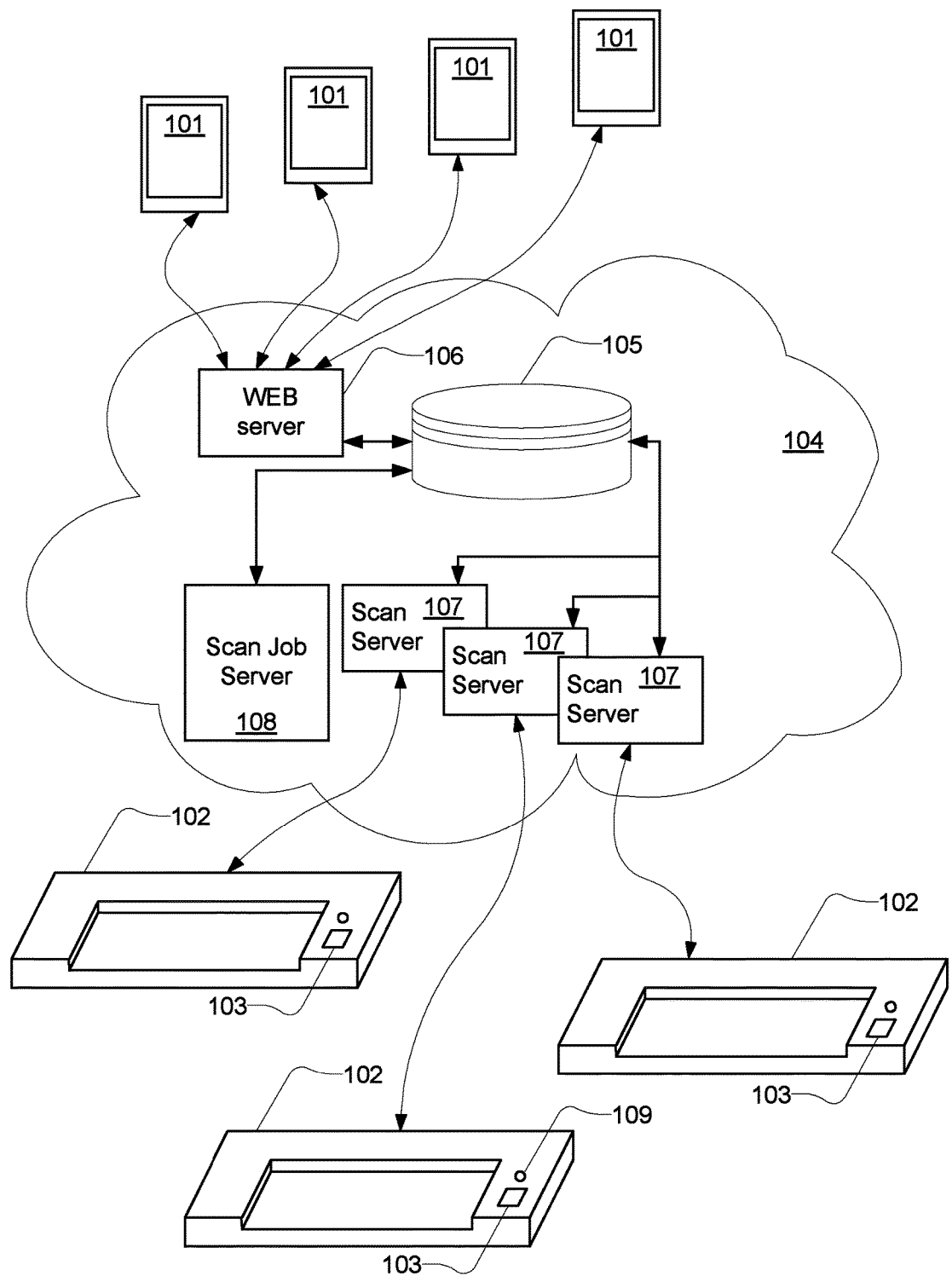
FIG. 1 shows a block diagram of server computer, a group of document scanners and a set of user devices.

FIG. 1 shows a block diagram of server computer, a group of document scanners and a set of user devices. The server computer 104 comprises, in the shown embodiment, a database 105, a web-server 106, a scan job server 108 and multiple instances of scan servers 107. The servers 106, 107, and 108 communicate via the database 105. In some embodiments the server 104 is implemented as a so-called cloud service (cf. cloud computing). A conventional advantage thereof is that the server can be scaled dynamically to use computing resources as required in a present situation, e.g. comprising shifting computing resources geographically as needed. However, other implementations can equally well be implemented.

The document scanners 102 constitute a group of scanners. They are each equipped with a sparse user interface, which as shown comprises a button 103 configured to receive a user's confirmation of a request for a scanning operation and an indicator 109 configured to signal to the user e.g. by light and/or sound. The scanners 102 are configured with a data network interface that enables communication between a scanner 102 and the server 104. The server computer 104 can issue commands or requests to the scanner, messages or download data to the scanner. A scanner can issue so-called alive signals to the server and transmit status messages. A scanner can e.g. transmit data to the server in response to a request from the server. Such data network communication is known to a person skilled in the art.

The web-server 106 is configured to make a web-interface for requesting a scanning operation available to the user via his electronic device. The information received from the user and the information sent to the user via his electronic device are stored in or retrieved from the database 105. In some embodiments the database is an SQL database or SQL server; however, other types of databases may be used. In some embodiments the web-server 106 is configured to make a web-interface allowing persons to register in the database as users and to submit and/or receive user credentials.

The scan job server 108 is configured to distribute a requested and granted scanning operation (sometimes denoted a scan job) to a respective scan server 107.

A scan server 107 connects and communicates with a respective selected scanner and performs the scanning operation comprising receiving an electronic reproduction from the selected scanner 102. When communicated from the scanner 102 to the scan server 107, the electronic reproduction is sometimes denoted scan data. Scan data are often formatted in a proprietary data format.

The database 105 is configured to store data on each scanner, each user and each scan job. The data on each scanner comprises indication of reservation status, its serial number and/or alias, selectable options for the scanner, e.g. scan resolution, calibration data and other scanner specific data. The data on each user comprises user name, password or encoded password, a delivery address for electronic reproductions (documents) in the form of an e-mail address and/or a URL to web or cloud storage space. The data on each scan job comprises an identification of the user assigned to the electronic reproduction resulting from the scan job.

Figure 2:
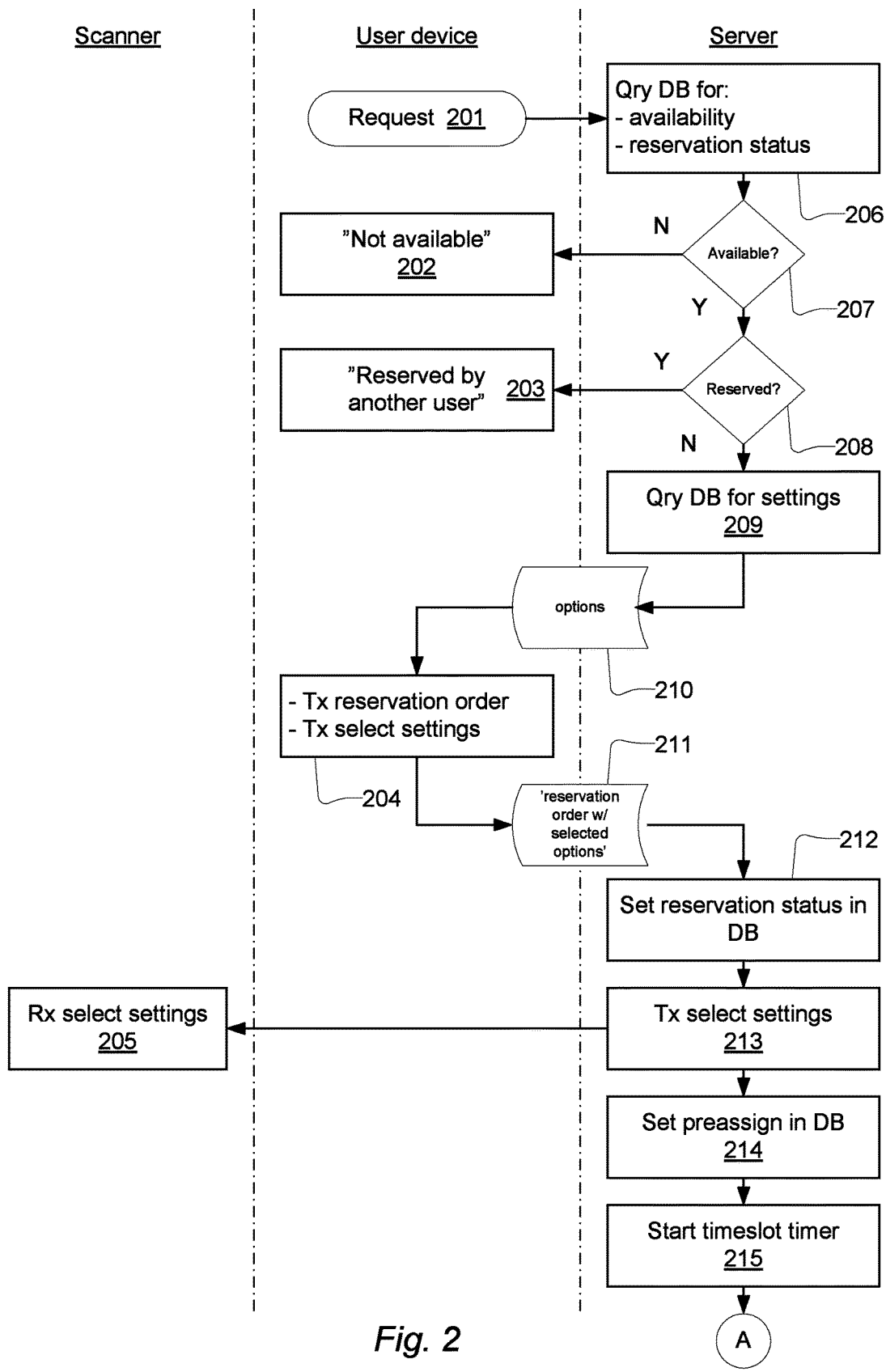
FIG. 2 shows a first portion of a flowchart for a method of operating the server computer.

FIG. 2 shows a first portion of a flowchart for a method of operating the server computer. The flowchart is divided into three sections denoted 'scanner', 'user device' and 'server' to illustrate where different steps of the method illustrated by the flowchart are performed in some embodiments.

The method starts in step 201 with a request for a scanning operation being submitted from the user device to the server. Prior to this step users and scanners are registered in the database and the scanners submit a so-called 'alive signal' at intervals to the server to indicate that the respective scanners are available for being selected.

The request may be generated at the mobile device, e.g. by using the mobile device to scan a so-called QR-code attached to the selected scanner wherein the QR-code is encoded with a URL that addresses a web-page of the selected scanner on the server computer and thereby uniquely identifies the document scanner among the group of document scanners. The user may be prompted to enter user credentials so as to identify and authenticate the user to the server computer 104 by a user identifier. Consequently, the server knows the user identifier and the scanner identifier.

In response to receiving the request, in step 206 the server processes the request and its data and prepares a query to the database to examine whether the selected scanner is available and whether it is reserved. If the scanner is not available, the user receives a notification in step 202 via step 207. If the scanner is reserved, the user receives a notification in step 203 via step 208.

If the selected scanner is available and is not reserved, then in step 209 a query is prepared to the database to retrieve a set of available options 210, which are submitted to the user device.

The user device makes the options available for the user to select an option and submit an order in step 204. The selected options and the order 211 are transmitted to the server, which, in step 212, sets the reservation status for the selected scanner to 'reserved'. In some embodiments step 212 is performed when the reservation status has been examined in step 208; i.e. step 212 is performed before step 209.

In the following step 213, the selected options are transmitted from the server to the scanner as selected settings, which the scanner receives in step 205. In step 214 the electronic reproduction expected from the selected scanner is assigned or preassigned in the database to the user identified by the user identifier.

The predefined time period within which the user has the opportunity to confirm his request is then started in step 215.

Symbol 'A' indicates that the flowchart continues.

Figure 3:
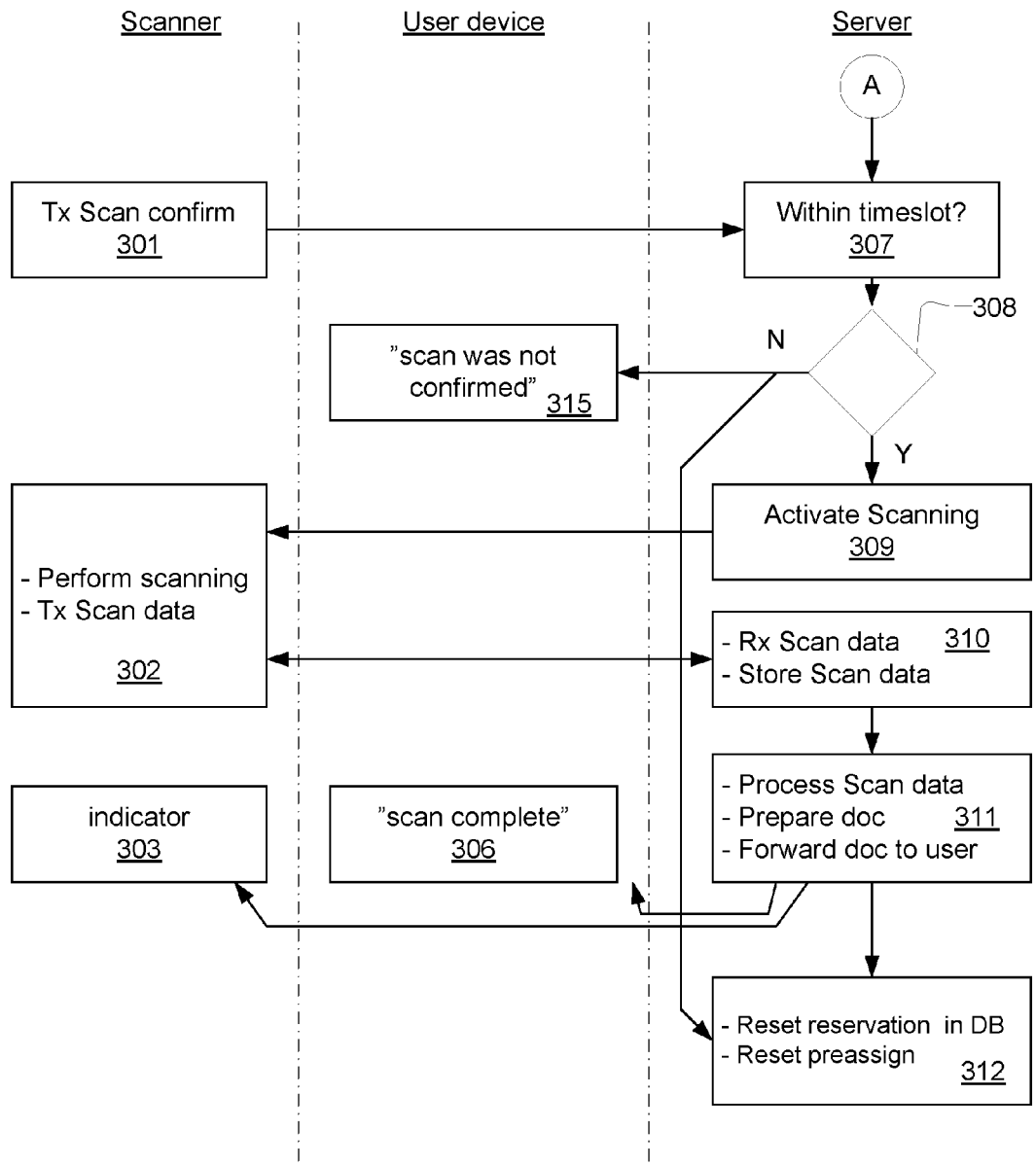
FIG. 3 shows a second portion of the flowchart.

FIG. 3 shows a second portion of the flowchart. The flowchart continues from symbol 'A'. Step 307 awaits the confirmation of the user's request in the form of a predefined user generated event in step 301, e.g. a button on the scanner being pressed.

If the request is not confirmed (N) within the predefined time period (also denoted timeslot), the reservation made in step 212 lapses (i.e. altered back to a not-reserved or free status by means of step 312), and the user is then notified in step 315 via step 308 that the "scan was not confirmed".

If the confirmation is received within the predefined time period (Y), then, in step 309, the requested scanning operation is activated and scanning is performed in step 302. The scanning operation comprises transmitting scan data from the scanner to the server, which stores the scan data temporarily in a data memory of the server. Steps 302 and 310 interact to perform the scanning.

When at least a portion of or a full set of scan data in respect of a scan job has arrived at the server, the scan data are processed in step 311 to prepare an electronic file or electronic document that is delivered to the user at a specified address, e.g. an email address. In some embodiments processing of the scan data comprises processing with calibration data to correct imperfections in the electronic reproduction. A person skilled in the art is familiar with techniques to perform such correction and to retrieve calibration data from the scanner.

In some embodiments the user is notified that the scanning operation was completed by submitting a notification, e.g. a text message with the wording "scan complete" to his user device in step 306 and/or by activation of an indicator on the scanner, e.g. a light and/or sound indicator in step 303.

Subsequently, the reservation status for the scanner is reset in the database in step 312, and a preassignment of a document from the then selected scanner to the then current user is reset. The execution of step 312 can be performed at an earlier stage, e.g. when all scan data of a scan job are received in full or are about to be received in full.

In some embodiments the method proceeds after step 310 or after step 311 with a step of starting a further predefined time period or time slot within which the user can confirm that he wishes to continue with further scanning operations, e.g. to scan another page in a multi-page scan job. Such confirmation is given by raising a predefined further user generated event, e.g. as a user presses a button on the scanner or when a sensor of the scanner detects that another piece of paper (or other object to be scanned) is inserted into the scanner. In case confirmation is received, a further scanning operation is performed in a similar way as described above. The above-mentioned NFC technique can also be used to confirm the further (continued) scanning operation.

In case confirmation is not received, the reservation terminates prematurely also as described above, and the method proceeds either to step 311 or to step 312.

In some embodiments the server notifies the user via the user interface of the scanner or via the user's device that a period within which to confirm continued scanning is running.

The server may process electronic reproductions from respective scanning operations, within the procedure for continued scanning described above, to deliver a multi-page document to the user. The option to deliver a multi-page document may be selected by the user from his electronic device or it may be a default procedure or default, but de-selectable, option.

Figure 4A:
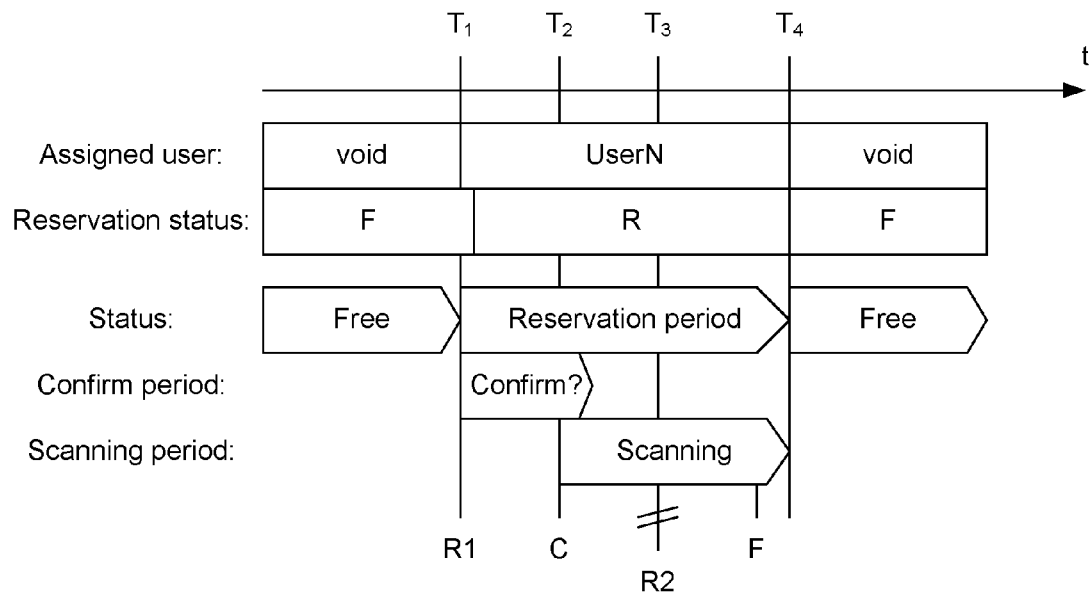
FIGS. 4a and 4b show timing diagrams.
Figure 4B:
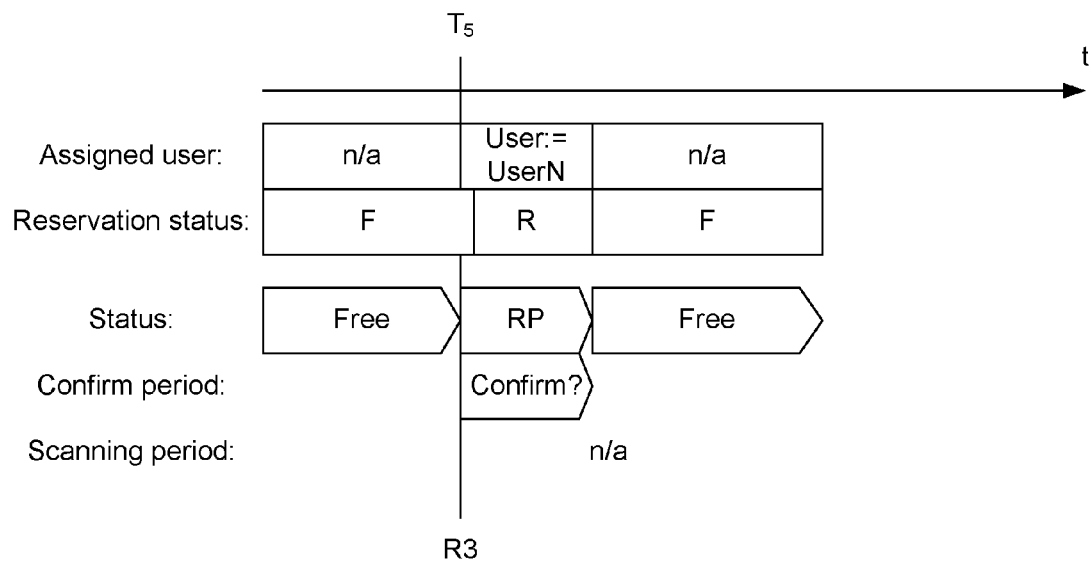

FIGS. 4a and 4b show timing diagrams. The timing diagrams illustrate different scenarios for a specific scanner and show reservation status, assigned user, a predetermined period for confirming a request for a scanning operation and a period where scanning is performed as a function of time t.

In connection with FIG. 4a, at a first period of time, the scanner is not reserved; it is free. This reservation status is registered in the database with the value 'F'. Since the scanner is free, no user is assigned to receive electronic reproductions from the scanner via the server; this is registered in the database with the value 'void'.

At a point in time, $T_1$, a user's request for a scanning operation at the scanner is registered, and since the reservation status indicates that the scanner is free, a reservation of the scanner is granted shortly after reception, at the server, of the request R1 for a scanning operation. In connection therewith the reservation status in the database is altered from 'F' to 'R' to indicate that the scanner is reserved for a period of time. Following the grant of the request, a user is assigned to the electronic reproduction that arrives from the scanner as a result of the scanning operation. Also, a predefined period of time designated 'confirm?' is started. The duration of the period is e.g. 30 seconds. If, within the predefined period of time, a predefined user generated event (designated 'C') is received at the server from the scanner, the reservation period is maintained or upheld until a scanning operation is terminated or cancelled. The scanning operation is performed during the period designated 'scanning'. When, at time $T_4$, the scanning operation is completed, the reservation status is altered back to 'F' to indicate that the scanner is free to be reserved for a subsequent scan job. Also, to ensure that the user does not receive other users' documents, the database is updated with the assigned user set to 'void' again.

In some embodiments the user is assigned to a scan job and may remain assigned to that scan job. Entries in the database representing the scan job may remain stored even after the scan job is completed and the document is delivered to the user.

A request R2 received at a point in time $T_3$ when the reservation is in force since the reservation status is 'R' is rejected as indicated by the two inclined line pieces.

In connection with FIG. 4b, at a first period of time, the scanner is not reserved; it is free. In this scenario, a request for a scanning operation is registered at a point in time, $T_5$. Since the reservation status indicates that the scanner is free, a reservation of the scanner is granted shortly after reception, at the server, of the request R3 for a scanning operation. In connection therewith the reservation status in the database is altered from 'F' to 'R' to indicate that the scanner is reserved for a period of time.

However, since a confirmation event is not received from the scanner with the predetermined time period "confirm?" the reservation lapses. In this example, it is shown that the reservation status is altered at the lapse of the predetermined time period "confirm?" or shortly thereafter.

The invention claimed is:

1. A computer-implemented method of operating a server computer serving a group of scanners connected to the server computer via a data network;
   wherein the group of scanners are registered in a database with a respective indication of reservation status;
   the method comprising:
   receiving, at the server computer, a request for a scanning operation from a user's electronic device; wherein the request comprises a user identifier and a scanner identifier selecting a scanner as a selected scanner from among the group of scanners;
   granting a reservation of the selected scanner upon reception of the request for the scanning operation, comprising altering the reservation status in the database;
   wherein the reservation lapses when a predefined time period lapses, unless the request for the scanning operation is confirmed via a predefined user generated confirmation event within the predefined time period, wherein the predefined time period is less than 35 seconds;
   receiving, at the server computer and from the selected scanner, the predefined user generated confirmation event which is transmitted from the selected scanner upon detection at the scanner of one or both of: the user pressing a button when an object to be scanned is properly inserted into the scanner without the user entering user credentials via the scanner; and a sensor of the scanner detecting that the object to be scanned is inserted into the scanner without the user entering the user credentials via the scanner;
   wherein, upon reception of the predefined user generated confirmation event within the predefined time period, the server:
   activates the scanning operation,
   maintains the reservation until the scanning operation is terminated or cancelled, and
   receives electronic reproduction resulting from the selected scanning operation performed at the selected scanner and assigns the electronic reproduction resulting from a selected scanning operation performed at the scanner to the user identified by the user identifier.

2. A computer-implemented method according to claim 1, comprising reading a code and submitting the code as a scanner identifier in the request for the scanning operation; wherein the code uniquely identifies the scanner among the group of scanners.

3. A computer-implemented method according to claim 1, wherein the step of transmitting the electronic reproduction resulting from the selected scanning operation performed at the selected scanner to the user identified by the user identifier is performed by:
   transmitting, from the server computer, to the user identified by the user identifier.

4. A computer-implemented method according to claim 1, comprising the step of:
   signaling to the user, via the scanner or via transmission to the user's electronic device, whether the scanner operation is granted or not.

5. A computer-implemented method according to claim 1, wherein the user identifier is linked to or comprises an email address and wherein the method comprises sending a first electronic document to the email address.

6. A computer-implemented method according to claim 1, wherein the user identifier is linked to or comprises the user credentials, and wherein the method comprises storing a first electronic document at an electronic storage space with login and download access protected by the user credentials.

7. A computer-implemented method according to claim 1, comprising the step of:
   running a web-server or web-service that upon request for a web-response transmits a web-response to the electronic device to configure it with a user interface for the user to enter information for the request.

8. A computer-implemented method according to claim 1, comprising the steps of:
   receiving settings for the scanner from the user; and
   transmitting the settings to the selected scanner for it to perform the scanning operation in accordance therewith.

9. A computer-implemented method according to claim 1, comprising the steps of:
   receiving the electronic reproduction resulting from the scanner registered in the database;
   receiving scanner specific calibration data from the scanner; and processing one or more electronic documents received from the scanner in accordance with the calibration data.

10. A computer-implemented method according to claim 1, comprising the steps of:
    receiving, from the selected scanner, a predefined further user generated event;
    wherein, upon reception of the predefined further user generated event within a predefined further time period, the server:
    maintains the reservation until a further scanning operation is terminated or cancelled, and
    assigns any further electronic reproduction resulting from a further scanning operation to the user identified by the user identifier.

11. A computer-implemented method according to claim 1, wherein the request for the scanning operation comprises an indication that a multi-page scanning operation is requested; and wherein the server computer receives a multiple electronic reproductions from a respective scanning operations, which the multiple electronic reproductions are processed by the server and delivered to the user identified by the user identifier.

12. A non-transitory computer-readable medium having data stored therein to perform the method according to claim 1 when run by a computer.

\* \* \* \* \*